April 1, 1941.   P. E. KNUDSEN   2,237,035
LIGHT SCREEN FOR BUILDING CONSTRUCTIONS
Filed Oct. 14, 1938   2 Sheets-Sheet 1

INVENTOR.
PERCY E KNUDSEN
BY Bradley & Bee
ATTORNEYS.

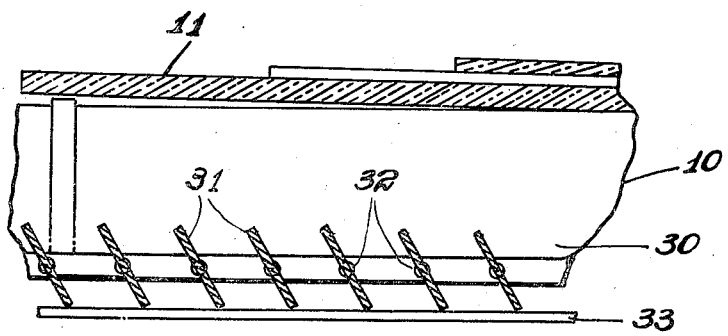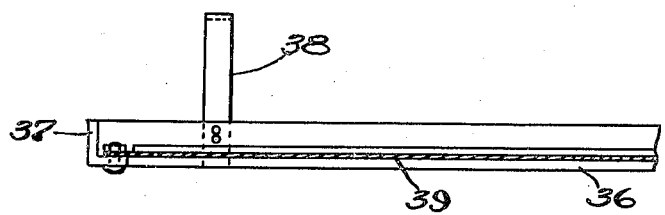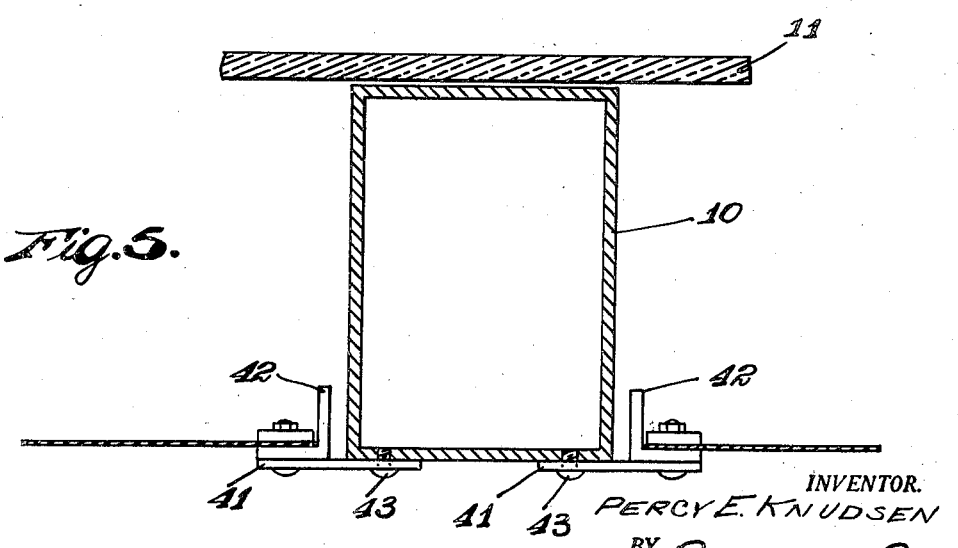

Patented Apr. 1, 1941

2,237,035

UNITED STATES PATENT OFFICE 2,237,035

LIGHT SCREEN FOR BUILDING CONSTRUCTIONS

Percy E. Knudsen, Pittsburgh, Pa., assignor to Pittsburgh Plate Glass Company, Allegheny County, Pa., a corporation of Pennsylvania Application October 14, 1938, Serial No. 234,993

2 Claims. (Cl. 108—16)

The present invention relates to the provision of light screens for use in buildings and notably for use in buildings with walls or roofs, which are formed of a transparent material such as glass or the like.

One object of the invention is to provide a light screen for use in connection with buildings having glass roofs or walls, which screen is attractive in appearance and which may easily be attached or detached at will as circumstances may require.

A second object of the invention is to provide a screen of the foregoing type which may be employed to reduce the amount of heat transmitted between the roof or wall and the air within a room or building.

These and other objects of the invention will be apparent from the consideration of the following specification and the appended claims.

It has heretofore been proposed to employ sheet or plate glass as a medium for forming the roofs or side walls of buildings. Glass of course possesses great resistance to the action of fumes and chemicals in the air and also to the action of atmospheric elements. Likewise, when appropriately arranged it provides an exceptionally attractive appearance and further acts as a light-transmitting medium for the building in which it is employed. One convenient mode of employing plates or sheets of glass involves a provision of a skeleton framework comprising rafters or studdings of wood or metal upon which the plates of glass in the form of shingles, or tiles or of panes in suitable sashes are secured by convenient means.

One objection to such constructions has been that no convenient means was available for controlling the amount of light and heat introduced into a building through the glass. For example, where glass roofs were employed, a glare entering from above was often strong and disagreeable. Likewise the air beneath the roof was permitted to contact directly with the heated surfaces and thus caused excessive heating or chilling of the interior of the buildings.

In accordance with the provisions of the present invention the foregoing difficulties are substantially obviated by the provision of a system of relatively rigid screens adapted to be secured to the rafters or beams of a building directly below the glass in such manner as to intercept disagreeable glare and immediately below the roof to provide a dead air space which acts as an insulator to prevent either excessive heating or chilling of the building.

For a better understanding of the invention reference may now be had to the accompanying drawings in which Figure 1 is a fragmentary isometric view of a portion of a roof upon which the screens constituting the subject matter of the present invention are employed.

Figures 3 and 4 are fragmentary cross-sectional views showing modified forms of screen panels.

Figure 5 is a fragmentary cross-sectional view showing a modified form of device for securing the screen to the rafters.

Figure 1:
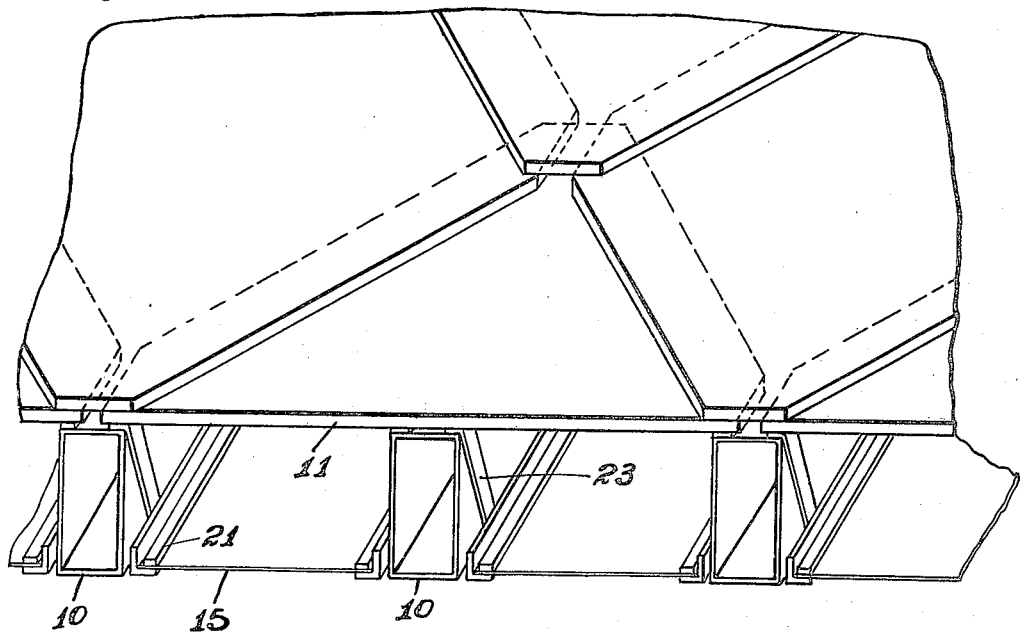
Figure 2:
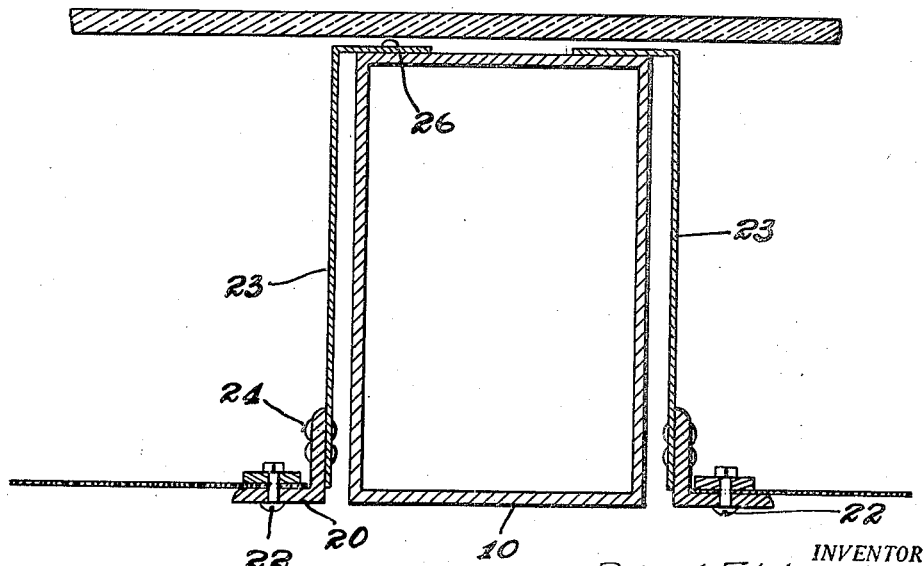
Figure 2 is a fragmentary cross-sectional view disclosing on a larger scale certain portions of the roof and the glare screens employed in connection therewith.

A convenient embodiment of the invention as disclosed in Figs. 1 and 2 of the drawings comprises a suitable supporting framework, e. g. a system of rafters 10 of any convenient design. The glass roofing material may be in the form of plates 11 of suitable size and outline. These plates may be arranged diagonally with respect to the center lines of the rafters and in overlapping or shingle relation. Preferably the rafters are so spaced that the corners and mid portions of each shingle are supported thereupon.

The screens constituting the subject matter of the present invention may comprise sheets or plates 15 of any suitable material. For example, they may be of colored or opalescent glass or of a more or less transparent resinous body, such as Celluloid, cellulose acetate, or the like. In some instances the sheet may be reinforced by means of wire woven into a suitable net or screen. Likewise, it is possible to employ sheets of translucent fabrics of appropriate color, such as silk, rayon, or the like. Likewise, the sheets or panels may comprise slabs or slats of opaque or translucent material secured together in such manner that they may be tilted in order to permit regulation of the amount of light admitted or to cut out the light from certain angles. This latter type of construction of course would substantially correspond in mode of operation to a Venetian blind.

The panels are supported along their margins by means of frame elements comprising for example angle bars 20 to which the screens 15 are clamped by means of bars 21 and bolts 22 extending through the bars and the edge portions of the screens. For purposes of securing the screens to the rafters 10, strap-like brackets 23 are secured to the angle bars 20 by welding or by rivets 24 and are provided at their upper extremities with laterally bent portions 26 adapted to hook over the upper faces of the rafters.

The straps 23 may be formed of a somewhat resilient material such as steel, brass, or the like, which will permit their upper ends to be sprung inwardly in such manner that they may be removed or applied to the rafters at will.

By proper selection of the material constituting the screens 15 it will be possible to obtain substantially any desired reduction of the amount of light transmitted to the building through the roof or covering. At any time the screens may be removed either for purposes of obtaining maximum illumination possible, or for purposes of cleaning the lower faces of plates 11 or of the screens. Of course, if desired, a number of sets of screens of different densities may be kept on hand and the ones giving the desired effects under any given set of conditions may be employed. Great variety in the decorative, or other effects desired in the building, may be obtained.

In addition to providing a convenient means for controlling the amount of radiation passing through the covering of the building, it will be apparent that the screens also if appropriately spaced from the covering coact with the rafters to provide dead air chambers which greatly reduce the amount of heat transmitted to or from the interior of the building through the roof.

In the form of the invention shown in Fig. 3 a frame comprising sides 30 is provided with transverse slats 31 of wood or other material. The slats are tiltable about pivots 32 secured to the ends of the slats and journaled in the edges of the frame, and are connected together for simultaneous rotation by a bar or bars 33. By adjustment of the positions of the slats the amount and the direction of incidence of the light may be controlled.

Supports for the screen include strap-like hooks 34 corresponding to those shown in Figs. 1 and 2.

In the form of the invention disclosed in Fig. 4, the screen includes a rigid frame comprising sides 36 and ends 37 supported upon hooks 38. The translucent body 39 may be of flexible material such as silk.

In the form shown in Fig. 5 the resilient strap-like hooks for suspending the frames from the rafters are replaced by relatively rigid lugs 41 projecting laterally from the sides 42. Screws 43 extending through the lugs are threaded into rafters 10 to hold the assembly in place.

Although only the preferred forms of the invention have been shown and described it will be apparent to those skilled in the art that numerous modifications may be made therein without departure from the spirit of the invention or the scope of the appended claims.

I claim:

1. A glare screen for use under a transparent or translucent roof, said roof being disposed upon supporting rafters, which screen is of approximately the same width as the space between the rafters, and further is provided with means for securing it in position between the rafters, the means consisting of strips of relatively springy metal secured to the edges of the screen and extending vertically above the screen, and having their upper extremities bent laterally to admit of releasably hooking them over the upper faces of the rafters without disturbing the roof above, or the adjacent screens.

2. A building construction comprising spaced rafters, a roofing medium comprising plates of glass supported upon the rafters and glare screens of a width approximately corresponding to the space between the rafters, said screens being capable of transmitting light and each being provided with means securing it independently of the other screens and comprising springy straps of metal extending upwardly from the edges of the screen and being provided at their upper extremities with laterally-extending, hooked portions projecting over the upper faces of the rafters, to hold the screen in position between the rafters, which portions are releasable without disturbing the roof above, or the adjacent screens.

PERCY E. KNUDSEN.